Sept. 21, 1971  YOZABURO UMEHARA  3,606,787
PROCESS FOR MANUFACTURE OF SPRING PINS HAVING
A WAVE-SHAPED GROVE AND APPARATUS THEREFOR
Filed Dec. 31, 1968  5 Sheets-Sheet 1

INVENTOR.
YOZABURO UMEHARA
BY
Young + Thompson
ATTYS.

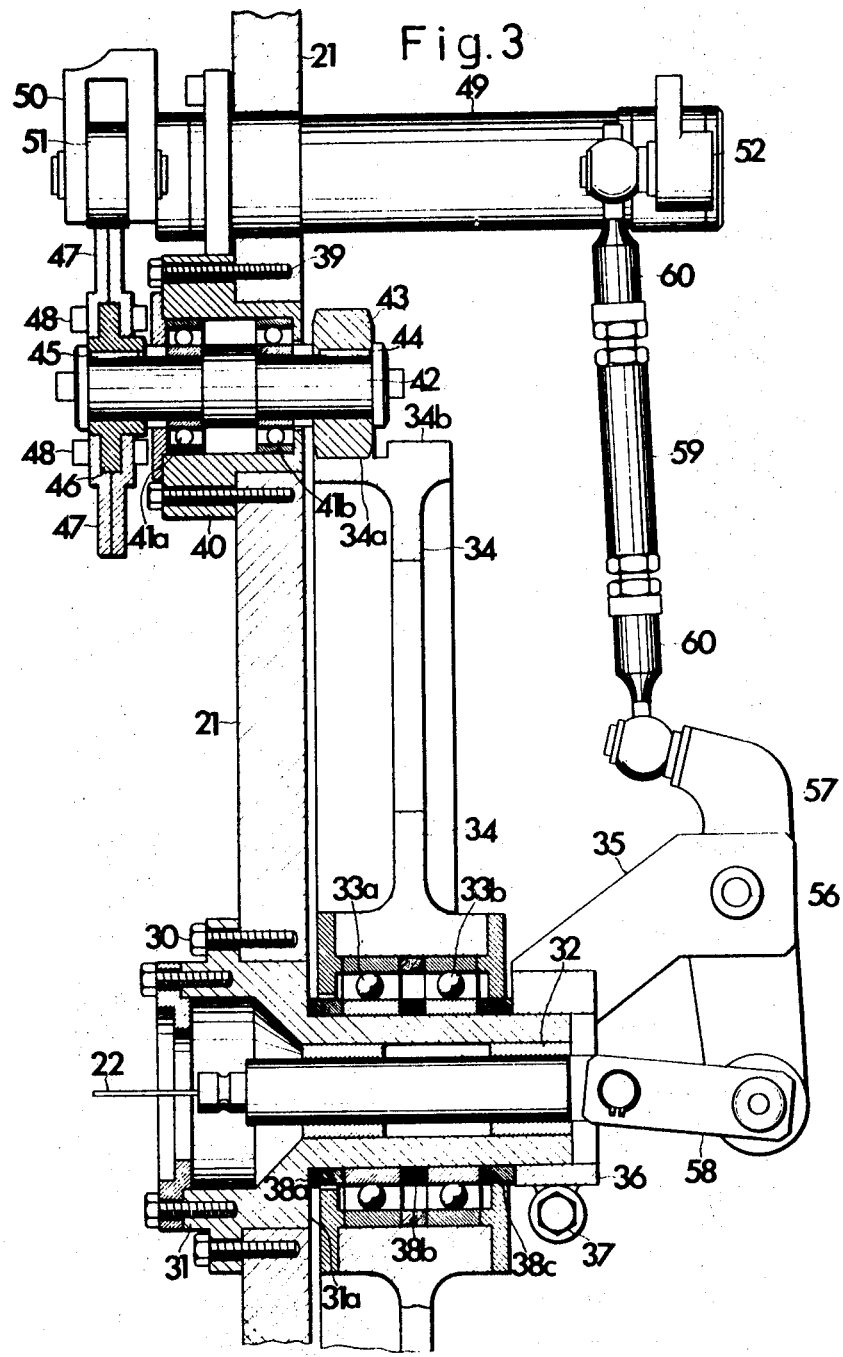

INVENTOR.
YOZABURO UMEHARA
BY
ATTYS.

Sept. 21, 1971 YOZABURO UMEHARA 3,606,787
PROCESS FOR MANUFACTURE OF SPRING PINS HAVING
A WAVE-SHAPED GROVE AND APPARATUS THEREFOR
Filed Dec. 31, 1968 5 Sheets-Sheet 4

INVENTOR.
YOZABURO UMEHARA
BY
Young & Thompson
ATTYS.

INVENTOR.
YOZABURO UMEHARA
BY Young & Thompson
ATTYS.

United States Patent Office 3,606,787
Patented Sept. 21, 1971

3,606,787
PROCESS FOR MANUFACTURE OF SPRING PINS HAVING A WAVE-SHAPED GROOVE AND APPARATUS THEREFOR
Yozaburo Umehara, 2–8–6 Skakujii, Nerima-ku, Tokyo, Japan
Filed Dec. 31, 1968, Ser. No. 788,128
Claims priority, application Japan, Nov. 28, 1968, 43/87,166
Int. Cl. B21d 39/02
U.S. Cl. 72—337
1 Claim

ABSTRACT OF THE DISCLOSURE

A process and apparatus for producing spring pins by automatically cutting into a predetermined length a length of rectangular plate blank so as to have a wave-shaped cut edge and winding the blank into the pin shape. The apparatus includes a mandrel which serves as a core around which is wound the blank, four tool posts each having one movable die respectively disposed outwardly peripherally and radially of said mandrel, a control device disposed upon the front side of the machine frame upwardly and to the left of said mandrel having a movable controlling member and a guide stand disposed upon the front side of the machine frame upwardly and to the right of said mandrel for guiding said blank, whereby the leading edge of the blank transferred along the guide stand is abutted against the controlling member so as to control the length of cut, thereafter the blank is cut into a predetermined length so as to have a wave-shaped cut edge by a pair of mating corrugated cutters formed on the opposed surfaces of the guide and the die of the tool post, the cut blank is wound around the mandrel by the dies of the tool posts, so as to form a spring pin having a wave-shaped groove and finally the mandrel is retracted so as to automatically drop thus formed spring pin.

BACKGROUND OF THE INVENTION

The present invention relates to a process and apparatus for producing spring pins, in which along a resilient cylinder is provided in the longitudinal direction thereof a groove whose opposing side edges are wave-shaped so as to engage with each other.

In the conventional method, the spring pins of the type described above are produced by pressing a plate blank by a press into predetermined dimensions in such a manner the opposing pair of side edges have mating wave-shaped, chamfering the side edges and winding into the cylindrical shape so that the wave-shaped edges are opposed to each other so as to be engaged when pressed. The disadvantages of this conventional method are the waste of the material, inefficient productivity and imperfect roundness of the spring pin. Therefore, high performance spring pins cannot be manufactured with the production stability all the time.

SUMMARY OF THE INVENTION

The present invention therefore provides a novel process and an apparatus for efficient line-mass-production of spring pins having a groove of the type described all having uniform quality at lower manufacturing cost. The novel features which are believed to be characteristic to the present invention are the provision of a plurality of tool posts each having a movable die disposed around a mandrel extendable to and retractable from the front side of the machine, a control stand having a movable controlling member and a guide stand, both of the stands being disposed left and right above the mandrel, whereby a length of the blank to be supplied through the guide stand is controlled by the controlling member, the blank is cut into a predetermined length by a pair of mating corrugated cutters formed in the opposing surfaces of one die and the guide stand, the cut blank is held between the controlling member and the guide stand so as to guide the cut blank in correct position to the mandrel until the cut blank is in contact with the upper surface of the mandrel, and the cut blank is wound around the mandrel into the cylindrical shape by the dies of the tool posts. According to the present invention the mass production of spring pins of the type described can be effected automatically with high efficiency. The roundness of the product is accurate and the performance of the products is always stable and reliable.

BRIEF DESCRIPTION OF DRAWINGS

The above and other objects, advantages and features of the present invention will become clear from the following description of a preferred embodiment thereof taken in conjunction with the accompanying drawings, in which:

FIG. 3 is a longitudinal sectional view illustrating mandrel driving or reciprocating device;

DESCRIPTION OF PREFERRED EMBODIMENT

Figure 1:
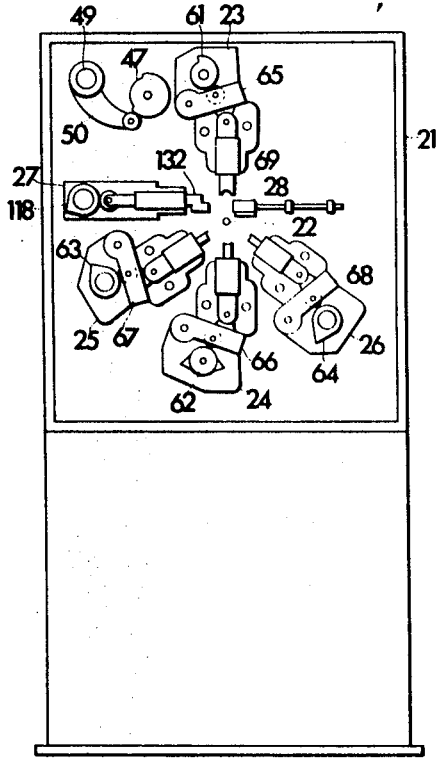
FIG. 1 is a front view illustrating one embodiment of an apparatus according to the present invention.
Figure 4:
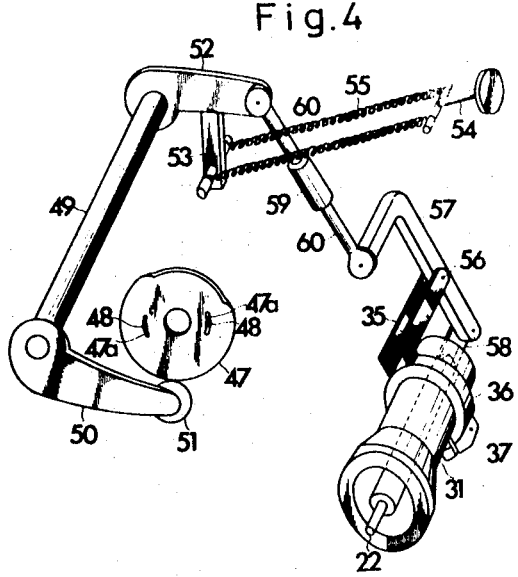
FIG. 4 is a perspective view illustrating the essential parts thereof.

Now referring to FIG. 1 illustrating the front view of the apparatus for use in the production of spring pins having a wave-shaped groove according to the present invention, the apparatus which is generally designated by reference numeral 20 comprises a frame 21, a mandrel 22 extending through the frame 21 and to the front side of the frame 21, tool posts or stands 23, 24, 25 and 26 disposed outwardly peripherally of the mandrel 22, a control device or stand 27 disposed upwardly of and to the left of the mandrel 22, and a guide stand 28 disposed upwardly of and to the right of the mandrel 22. The mandrel 22 serves as a core upon which the blank or material in the form of a plate 29 (which will be referred to as "plate material" hereinafter for brevity and will be described in more detail hereinafter). The mandrel 22 also serves to automatically drop the finished spring pin by retracting into the apparatus from the front side of the frame 21 upon completion of winding the plate material 29 around the mandrel 22. For this purpose, the mandrel 22 is incorporated with the transferring or reciprocating device as shown in FIGS. 3 and 4. The mandrel 22 is slidably fitted into bearing metals 32 disposed within a bearing holder 31 attached to the frame 21 by means of bolts 30. The bearing holder 31 extends into the frame 21 and rotatably carries a timing gear 34 around the outer periphery of the bearing holder 31 through two ball bearings 33a and 33b. Around the outer periphery of the end portion of the bearing holder 31 remote from the frame 21 is attached by means of bolt 37 a clamping ring 36 having a supporting arm 35, thereby holding in position the ball bearings 33a and 33b between the clamping ring 36 and the stepped portion 31a of the bearing holder 31 through washers 38a, 38b, and 38c, whereby the timing gear 34 is securely held in position. As shown in FIG. 3, another bearing holder 40 is attached to the frame 21 by means of bolts 39. A shaft 42 is rotatably disposed in this bearing holder 40 through two ball bearings 41a and 41b and at the inner end of the shaft 42 is carried a pinion 43 held in position by means of a key 44 and in mesh with one 34a of two toothed portions 34a and 34b. At the outer end of the shaft 42 is carried a cam holder 46 held securely in position by means of a key 45, and a cam 47 consisting of two plates is fitted over the cam holder 46 by means of bolts 48. In this case, as best shown in FIG. 4, the bolts 48 are fitted into arcuate slots 47a provided in the cam 47 so that the relative position of the cam 47 with respect to the cam holder 46 may be adjusted by loosening and tightening these bolts 48 after displacing the cam 47 to a suitable positon. Another shaft 49 is rotatably carried by the frame 21 in parallel with and in closely spaced apart relation with the shaft 42 carrying the cam 47. At the outer end of this shaft 49 is carried an arm 50 at the free end of which is carried a roller 51 in opposed relation with the cam 47. At the inner end of the shaft 49 is also carried an arm 52, and a spring 55 is loaded between a lever 53 extending from the intermediate of the arm 52 and a supporting arm 54 attached to the frame as shown in FIG. 4. Therefore, the roller 51 is normally pressed against the cam 47 by the restoring force of the spring 55. At the free end of the supporting arm 35 of the clamping ring 36 attached to the base end of the bearing holder 31 is rotatably carried a bell crank 57 by means of a pin 56. One end of this bell crank 57 is coupled to the base or inner end of the mandrel 22 through a connecting plate 58 while the other is coupled to the free end of the arm 52 through a connecting rod 60 having a turnbuckle 59 attached thereto at the intermediate thereof.

Thus, when the timing gear 34 is driven, the cam 47 is rotated through the pinion 43 so that the both arms 50 and 52 carried at both ends of the shaft 49 make vertical reciprocal motions. The motion of one arm 52 is transmitted to the mandrel 22 through the connecting rod 50, the bell crank 57 and the connecting plate 58 so that the mandrel 22 is caused to reciprocate or move to and away from the front side of the frame 21. Synchronization of the reciprocal motion of the mandrel 22 with respect to the drive of the timing gear 34 can be adjusted by adjusting the position of the bolts 48 of the cam 47 as described hereinabove. The adjustment of the extension or advancement of the mandrel 22 can be made by adjusting the length of the connecting rod 60 by means of the turnbuckle 59.

The tool posts 23, 24, 25 and 26 disposed peripherally and radially of the mandrel 22 serve to wind the plate material 29 around the mandrel 22 so as to form it into the cylindrical shape.

The construction of these tool posts 23, 24, 25 and 26 are substantially similar, with the exception of the profiles of the cams 61, 62, 63 and 64, the directions of the attachments of actuating arms 65, 66, 67 and 68 which are adapted to be actuated by these cams 61 to 64 respectively and the shapes of dies 69, 70, 71 and 72 disposed opposite to the mandrel 22.

Figure 5:
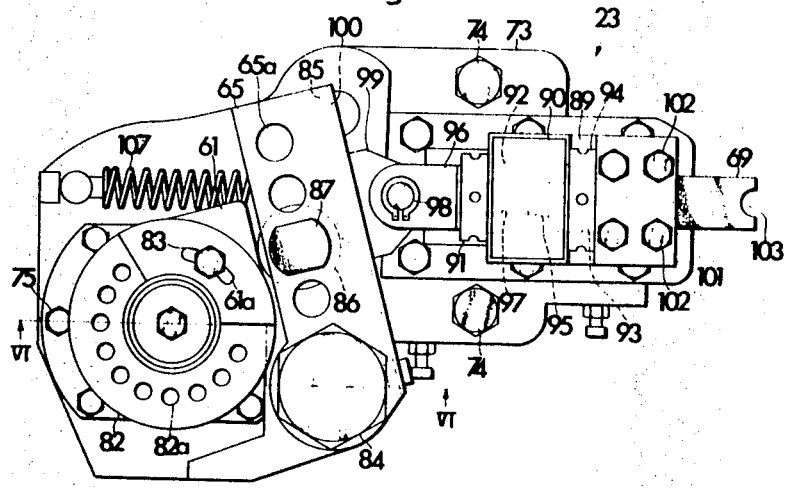
FIG. 5 is a front view illustrating one of tool posts disposed upon the apparatus of the present invention.
Figure 6:
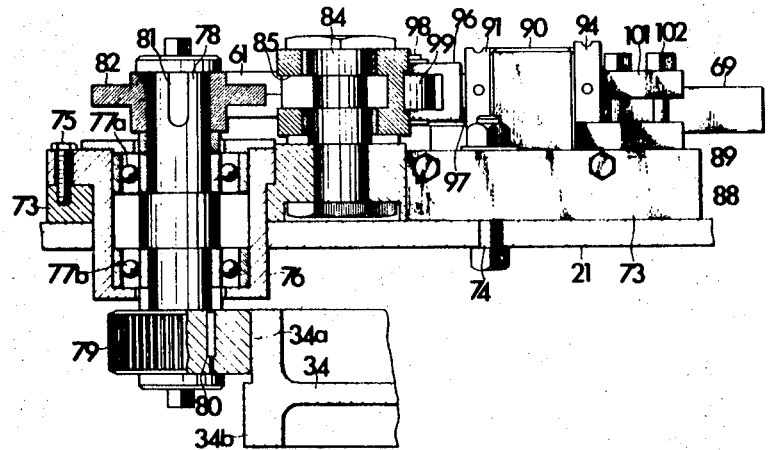
FIG. 6 is a longitudinal sectional view thereof taken along the line VI—VI of FIG. 5.

In view of the above, it will be sufficient only to describe the construction of the tool post 23 with reference to FIGS. 5 and 6.

The tool post 23 is attached to a predetermined position upon the frame 21 by means of bolts 74 through a base 73, which is provided with a bearing holder 76 attached thereto by means of bolts 75. In the bearing holder 76 is rotatably disposed a shaft 78 through two ball bearings 77a and 77b. At the inner end of the shaft 78 is carried a pinion 79 held in position by means of a key 80 and in mesh with the one toothed portion 34a of the timing gear 34 while at the outer end of the shaft 78 is attached a cam holder 82 secured in position by means of a key 81. The cam 61 consisting of two plates is fitted over the cam holder 82 by bolt 83, and the cam holder 82 is provided with a plurality of through bores 82a while the cam 61, with arcuate slots 61a. The bolt 83 is fitted into one of these through bores 82a and the arcuately elongated slots 61a, so that selecting one of the through bores 82a into which is fitted the bolt 83 can vary largely the relative position of the cam 61 with respect to the cam holder 82, whereby the cam holder 82 can be used in common among the tool posts 23 to 26. It will be further seen that the slots 61a of the cam 61 serve to make a fine adjustment of the relative position of the cam 61 with respect to the cam holder 82 by adjusting the bolt 83.

To the base 73 of the tool post 23 is pivotably attached an actuating arm 65 provided with a plurality of through bores 65a by means of a pivot 84 in opposed relation to the cam 61. The actuating arm 65 is provided with a groove 85 at one side surface thereof extending in the longitudinal direction thereof, and in this groove 85 is rotatably disposed a roller 86 by means of a pin 87 fitted into one of the through bores 65a. A portion of the peripheral edge of the roller 86 is normally extended beyond the groove 85 so as to make a contact with the cam 61.

The base 73 is provided at the front surface thereof a wedge-shaped groove 88 into which is sidably fitted a holder 89. At the upper surface of the holder 89 is disposed a supporting stand 90 into which is rotatably fitted the stem or cylindrical portion 92 of an adjustment nut 91, and the leading edge of the cylindrical portion 92 extends beyond the front end of the supporting stand 90. The extended portion is externally screw threaded 93 and is threadably in engagement with another adjustment nut 94. Thus, the supporting stand 90 is held between these adjustment nuts 91 and 94. The stem or cylindrical portion 92 of the adjustment nut 91 is provided at its center an internally threaded hole 95 into which is screwed a threaded lever 97 having at its base end a connecting member 96. To the connecting member 96 is pivotably coupled a sliding coupling member 99 by means of a pivot 98 and this coupling member 99 is adapted to fit slidably into a groove 100 formed in one side surface of the actuating arm 65.

Figure 9:
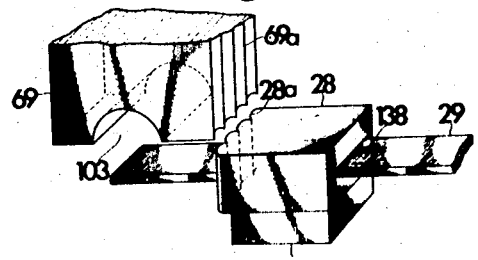
FIG. 9 is a perspective view illustrating the essential part of a pair of cutters.

At the extreme end of the holder 89 is attached the die 69 by means of bolts 102 through a clamping plate 101. The die 69 has a semi-circular groove 103, whose diameter is slightly larger than that of the mandrel as best shown in FIG. 9, and the groove 103 is in opposed relation with the mandrel 22 as best shown in FIG. 1. As described above, the groove 103 is semi-circular as shown in FIG. 5, but grooves 104, 105, 106 of the dies 70, 71 and 72 of the tool posts 24, 25 and 26 have respectively suitable arcuated forms in cross section which are best adapted to attain the purposes of the dies. Between the holder 89 and the base 83 is loaded a spring 107 so that the holder 89 is normally biased toward the actuating arm 65 by the restoring force of the spring 107, thereby normally pressing the sliding coupling member 99 against the groove 100 formed at the side surface of the actuating arm 65 and simultaneously pressing the roller 86 of the actuating arm 65 against the cam 61. When upon rotation of the timing gear 34 the cams 61 to 64 are rotated and the rotated and the rollers 86 of the actuating arms 65 to 68 are moved upwardly by these cams, the actuating arms 65 to 68 are rotated about the shaft 84 so that the holder is pushed out together with the dies 69 to 72 through the sliding coupling member 99 and the connecting member 96. On the other hand, when the engagement of rollers 86 with the cams 61 to 64 is released, the dies 69 to 72 are retracted to their normal positions as shown in FIG. 5 together with the holder 89 and actuating arms 65 to 68 by the springs 107.

Synchronization of the actuation of the dies 69 to 72 with respect to the rotation of the timing gear 34 can be effected by adjusting the positions of the cams 61 to 64 by the bolts 83. The stroke of each of the dies 69 to 72 can be adjusted by changing the position of the roller 86 relative to the actuating arm 65 to 68 by means of the pin 87.

Figure 7:
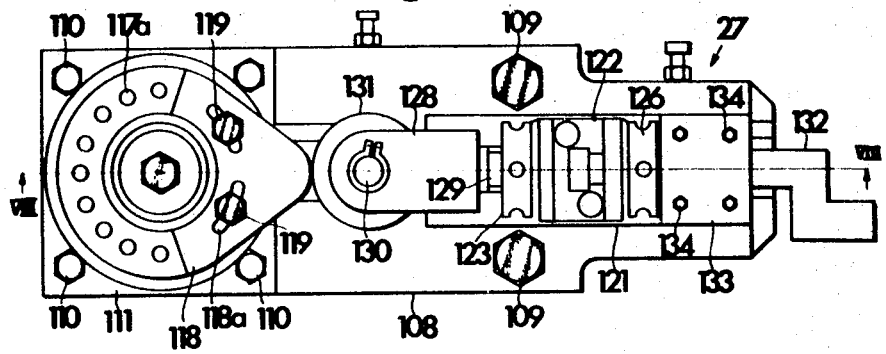
FIG. 7 is a front view of a control device or stand.
Figure 8:
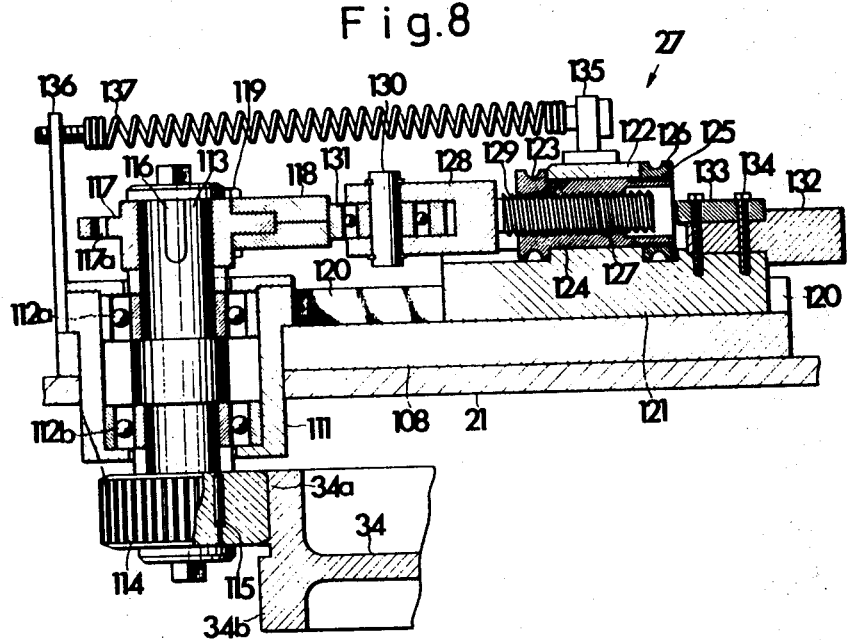
FIG. 8 is a longitudinal sectional view thereof taken along the line VII—VII of FIG. 7.

In other words, when the roller 86 is positioned closer to the shaft 84 of the actuating arms 65 to 68, the angle of rotation of each of these actuating arms is increased so that the stroke of the die is also increased. On the other hand, when the roller 86 is positioned away from the shaft 84, then, the angle of rotation of the arm is decreased, thus decreasing the stroke of the die. The adjustment of the pressure from the die to the mandrel 22 can be adjusted by loosening the adjustment nut 94 above the holder 89 and thereafter rotating the adjustment nut 91 so as to displace in the longitudinal direction the holder 89 through the engagement between the threaded rod 97 of the connecting member 96 and the internally threaded hole 95 of the adjustment nut 91. The control device disposed upwardly and to the left of the mandrel 22 serves to control the length of the plate material 29 and to guide the plate material 29 to the mandrel 22 in correct position when the plate material 29 is pressed against the mandrel 22 by the die 69 of the upper tool post 23. The control device 27 will be described in more detail with reference to FIGS. 7 and 8. As in the case of the tool posts 23 to 26, the control device 27 is attached to a predetermined position of the frame 21 by means of bolts 109 through its base 108. This base 108 is provided with a bearing holder 111 attached thereto by means of bolts 110, into which is disposed rotatably a shaft 113 through two ball bearings 112a and 112b. At the inner end of the shaft 113 is carried the pinion 114 secured in position by means of a key 115 and in mesh with the one toothed portion 34a of the timing gear 34 while the outer end of the shaft 113 carries a cam holder 117 secured in position by means of a key 116. To the cam holder 117 is fitted a cam 118 consisting of two plates and being secured in position by means of bolts 119. A plurality of through bores 117a are provided in the cam holder 117 and the cam 118 is provided with arcuate slots 118a. The bolts 119 are fitted into one of the through bores 117a and the arcuate slots 118a as in the case of the tool posts 23 to 26 described hereinabove. Therefore, the relative position of the cam 118 with respect to the cam holder can be varied by suitably selecting the through bore 117a of the cam holder 117 into which is fitted the bolt 119 so that the cam holder 117 can be used in common with the cam holder 82 of the tool posts 23 to 26. It will be further seen that the arcuate slots 118a of the cam 118 serve to make a fine adjustment of the relative position of the cam 118 with respect to the cam holder 117 by loosening the bolt 119 and tightening again after adjustment.

The base 108 is provided with a wedge-shaped groove 120 at the front portion thereof, and a holder 121 is disposed for slidable engagement with this groove 120. The holder 121 is provided with a supporting stand 122 disposed upon the upper surface of the holder 121. As in the case of the tool posts 23 to 26, the stem or cylindrical portion 124 of an adjustment nut 123 is rotatably fitted into the supporting stand 122 and the leading end of the stem or cylindrical portion 124 extends beyond the end surface of the supporting stand 122 and is provided with external screw threads 125. Another adjustment nut 126 is threadably engaged with this threaded portion 125. Thus, the supporting stand 122 is held between two adjustment nuts 123 and 126. One of the adjustment nuts 123 is provided with an internally threaded hole 127 extending along the axial direction of the stem or cylindrical portion 124, and a threaded cord having a connecting member 128 at the base end thereof is screwed into the internally threaded hole 127. A roller 131 is rotatably attached to the connecting member 128 by means of a pin 130 so as to make a contact with the cam 118.

At the leading end of the holder 121 is attached by means of bolts 134 through a clamping plate 133, a control member 132, which is in the form of a crank and the extreme end of which is positioned slightly upwardly and to the left of the mandrel 22 as shown in FIG. 1. A spring 137 is loaded between a spring stay 135 attached to the supporting stand 122 of the holder 121 and a spring stay 136 attached to the base 108 so that the holder 121 is normally biased to the cam 118 by the spring, thereby pressing normally the roller 131 against the cam 118.

When the cam 118 rotates through the pinion 114 upon the rotation of the timing gear 34 and the roller 131 is moved upwardly by the cam 118, the control member 132 as well as the holder 121 is pushed forward by the connecting member 128. On the other hand, when the engagement of the cam with the roller 131 is released, the control member 132 together with the holder 121 return to their normal position by the spring 137. In this case, the synchronism of the actuation of the control member 132 with respect to the timing gear 34 can be adjusted by adjusting the position of the cam 118 relative to the cam holder 117 by the bolts 119. The adjustment of the extension of the control member 132 can be made by loosening one of the adjustment nuts 126 upon the holder 119 and thereafter rotating the other adjustment nut 123 so as to displace the holder 121 in the longitudinal direction thereof through the engagement of the threaded rod 129 of the connecting member 128 with the internally threaded hole 127 of the adjustment nut 123.

The guide stand 22 is disposed upwardly and to the right of the mandrel 22 as shown in FIG. 1 in such a manner that when the die 69 of the upper tool post 23 is in operative stroke, the side surface of the guide stand abuts against the side surface of the die 69 in opposed relation with the side surface of the leading portion of the control member 132 of the control device 27.

As shown in FIG. 9, this guide stand 28 is provided with a through bore 138 through which is passed the plate material 29 from the right of the frame 21, so that the plate material 29 may be supported and guided. The guide stand is securely fixed to a receiving stand 139 so as to be supported and reinforced thereby.

The guide stand 28 further serves to shear in the form of wave the plate material in cooperation with the die 69 of the upper tool post 23. For this purpose, the side surface of the guide stand 28 is provided with corrugated cutter 28a as best shown in FIG. 9 and the side surface of the die 69 is provided with the corrugated cutter which mate with the cutter 28a so that the plate material 29 is cut so as to have a wave-shaped cut end by the cutters 28a and 69a when the die 69 is in operative downward stroke.

Furthermore, the guide stand 28 serves to guide to the mandrel the cut plate material 29 in cooperation with the control member 132 of the control device 27. When the control member 132 is extended from the control device 27 on the right side of the plate material 29, the plate material 29 is supplied until the leading edge of the plate material 29 abuts against the control member 132 whereby the length of the plate material to be cut can be controlled. Thereafter, when the plate material 29 is cut so as to have a wave-shaped cut edge by the die 69 and thus cut plate material 29 is held between the guide 28 and the control member 132 in its downward movement by the die 69 so that the plate material 29 therebetween can be prevented to fall naturally. Thereafter, the plate material 29 is pressed between the die 69 and the mandrel 22 into the form of the groove 103, that is inverted U-shape. For this purpose, it is preferable that the guide stand 28 and the control member 132 hold in position the plate material 29 therebetween until the plate material pushed downward by the die 69 reaches the upper surface of the mandrel 22 and is held in position by the mandrel 22 and the die 69. Furthermore, it is preferable that the guide stand and the control member 132 are moved away from the plate material 29 at the instant when the plate material 29 is started to be bent into an inverted U-shape in the groove 103 of the die 69. For this purpose, both of the lower surfaces of the control member 132 and the guide stand 28 are extended to the plane including the upper surface of the mandrel 22, or to a plane spaced apart from the above plane only by a little distance. When the guide stand 28 as well as the control member 132 are arranged as described above, the die 72 of the lower right tool post 26 can be prevented from colliding against the guide stand 28 when extended toward the mandrel 22. So far the specification has been described with respect to the construction and the mode of operation of each of the mandrel 22, its driving device, the tool posts 23 to 26, and control device or stand 27 and the guide stand 28.

Figure 2:
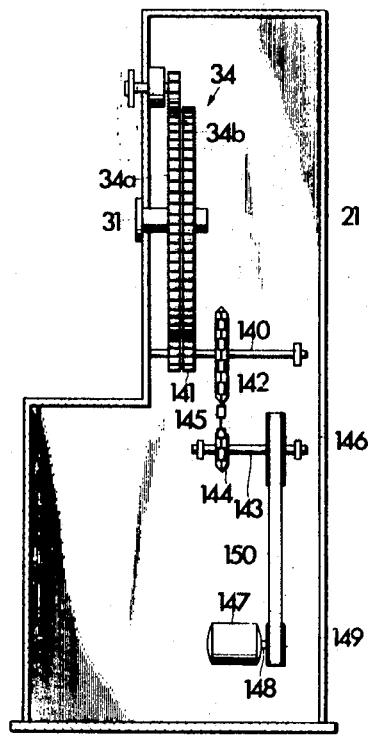
FIG. 2 is a longitudinal sectional view illustrating a driving device thereof.

Next the mode of operation of the timing gear 38 which drives the cams 47, 61, 62, 63, 64 and 118 of the above components will be described hereinafter. As shown in FIG. 2, the timing gear 34 has its toothed portion 34b meshed with the pinion 141 carried by the shaft 140. And the sprocket 142 carried by this shaft 140 is interconnected with another sprocket 145 by a chain 145, and a pulley 146 attached to the shaft 143 is interconnected to another pulley 149 carried by a shaft 148 of an electric motor 148 mounted upon the frame 21 by a belt 150. Thus, the timing gear 34 is driven by the electric motor 147.

The rotation of the motor 147 is further transmitted through the timing gear 34 and pinions 43, 79 and 114 in mesh therewith to the cams 47, 61, 62, 63, 64 and 118 respectively so that the mandrel 22, the tool posts 23, 24, 25 and 26 and their dies 69, 70, 71, 72 and 73, and the control member 132 of the control device 27 in accordance with the predetermined synchronization with each other. In this case, the relative positions of the cams 47, 61, 62, 63, 64 and 118 with respect to their cam holders 46, 82 and 117 are so adjusted that the following actuations and operations can be sequentially effected in synchronism with each other during a predetermined rotation of the timing gear 34:

(1) the mandrel 22 extends out of the frame 21;
(2) the control member 132 extends from the control device 27;
(3) the die 69 of the upper tool post 23 extends;
(4) the die 70 of the lower tool post 24 extends;
(5) the control member 132 of the control device 27 retracts;
(6) the die 70 retracts;
(7) the dies 71 and 72 of the tool posts 25 and 26 respectively disposed right and left below the mandrel extend;
(8) the die 70 extends again;
(9) the dies 69, 70, 71 and 72 retract; and
(10) the mandrel 22 is withdrawn into the frame.

Figure 10:
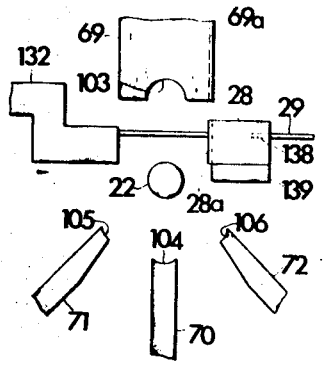
FIGS. 10 to 15 are front views illustrating various production steps.

Next the method of manufacturing spring pins having a wave-shaped groove by the apparatus as described hereinabove will be described. First the motor 147 is driven and the timing gear 34 is rotated. Then, the mandrel 22, the dies 69 to 72 of the tool posts 23 to 26 and the controlling member 132 of the control device 27 are actuated in sequence in the order as described above. As shown in FIG. 10, first the mandrel 22 is extended from the surface of the frame 21 and the controlling member 132 is also extended. Next the plate material 29 whose both side edges are previously chamfered is made to pass through the through bore 138 of the guide stand 28 by a suitable well known means for example gripper feed until the leading edge of the plate material abuts against the controlling member 132.

Figure 11:
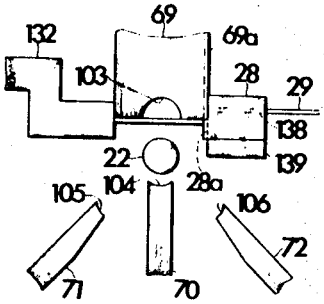

In the second step, as shown in FIG. 11, the die 69 of the upper tool post 23 is extended so that the plate material 29 is cut into a predetermined length so as to have a wave-shaped cut edge by the cutters of the die 69 and the guide stand 28. When the plate material 29 is cut for the first time, its leading edge is flat, that is not in wave-shape, but from the second cuts both edges of the plate material 29 have similar wave-shaped cuts. Thus cut plate material 29 is held and guided by the controlling member 132 and the guide stand 28 and moved by the downward movement of the die 69 toward the mandrel 22.

Figure 12:
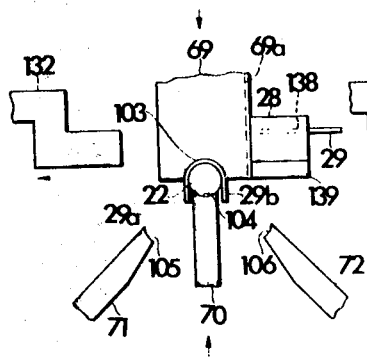

In the third step as shown in FIG. 12, the die 70 is extended from the lower tool posts 24 so that the mandrel 22 is held in the groove 104 at the leading edge of the die 70. The lower surface of the plate material 29 abuts against the upper surface of the mandrel 22 so as to be held therebetween. At this instant the controlling member 132 is retracted to its normal position and the plate material is bent in inverted-U-shape between the groove 103 and the mandrel 22 by the downward movement of the die 69.

Figure 13:
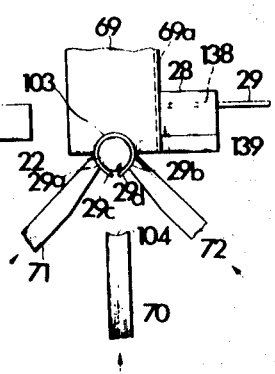

In the fourth step as shown in FIG. 13, at the instant when the die 70 is retracted from the mandrel to the normal position of the die 70, the dies 71 and 72 of the lower left and right tool posts 25 and 26 are extended while the plate material still remains held between the mandrel 22 and the die 69, so that both of the leg portions 29a and 29b of the inverted-U of the plate material 29 are bent inwardly by the grooves 105 and 106 at the leading edge of the dies 71 and 72 respectively.

Figure 14:
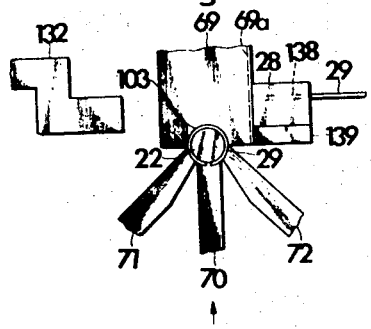

In the fifth step as shown in FIG. 14, while the plate material is held between the mandrel 22 and the dies 69, 71 and 72 of the upper and lower left and right tool posts 23, 25 and 26, the die 70 of the lower tool post 24 is extended again so that the groove 104 of the leading edge thereof bend inwardly both of the lower side edges 29c and 29d of the plate material 29.

Figure 15:
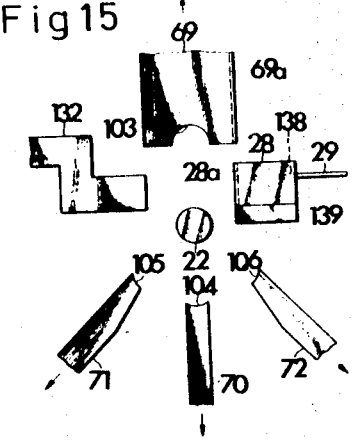

In the final or sixth step, as shown in FIG. 15, all of the dies 69 to 72 of the tool posts 23 to 26 are retracted to their normal positions and at the same time, the mandrel 22 is retracted into the frame 21 so that thus fabricated spring pin 151 having a wave-shaped groove is automatically dropped and transferred to the next process.

Figure 16:
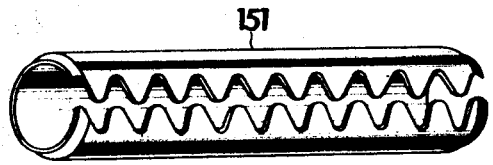
FIG. 16 is a perspective view illustrating a spring pin having a wave-shaped groove produced according to the method and apparatus of the present invention.

It will be readily understood that when the above described step cycles are repeated, the material rectangular in form is cut into predetermined length and thus cut material is wound around cylindrical shape, thus automatically and continuously fabricating the spring pins 151 having a wave-shaped groove as shown in FIG. 16.

So far the present invention has been described in particular reference with the illustrative embodiment thereof and there will be immediately obvious to those skilled in the art many modifications in structure, arrangement, proportions, the elements, materials, and components, used in the practice in the present invention, and otherwise, which are particularly adapted for specific embodiments and operating requirements, without departing from the principles of the present invention. The appended claim is therefore intended to cover and embrace any such modifications, within the limits only of the true spirit and scope of the present invention.

What is claimed is:

1. A process for manufacture of spring pins having a groove comprising the steps of
    cutting a blank by means of a pair of mating cutter blades;
    pressing against a mandrel disposed below said upper die thus cut blank by said upper die so as to bend said cut blank in an inverted U-shape while moving an extendable die into supporting relationship with the side of said mandrel which is opposite said blank;

retracting said extendable die and pressing against said mandrel both leg portions of inverted U-shaped blank by dies extendable toward said mandrel from the below left and right of said mandrel so as to bend aid leg portions inwardly;

pressing against said mandrel both of side edges of said cut blank by the first-mentioned extendable die so as to bend said side edges inwardly; and retracting said mandrel after all of said dies are retracted to their normal inoperative positions so as to automatically drop the thus fabricated product.

References Cited

UNITED STATES PATENTS

| | | | |
|---|---|---|---|
| 193,082 | 7/1877 | Griffin | 72—337 |
| 1,850,679 | 3/1932 | Leis | 72—337 |
| 1,973,436 | 9/1934 | Hjort | 72—337 |
| 2,804,622 | 9/1957 | Winberg | 72—337 |

RICHARD J. HERBST, Primary Examiner

U.S. Cl. X.R.

72—398